No. 888,591. PATENTED MAY 26, 1908.
H. C. COWARD.
CONVEYER FOR HAND TRUCKS.
APPLICATION FILED SEPT. 4, 1907.
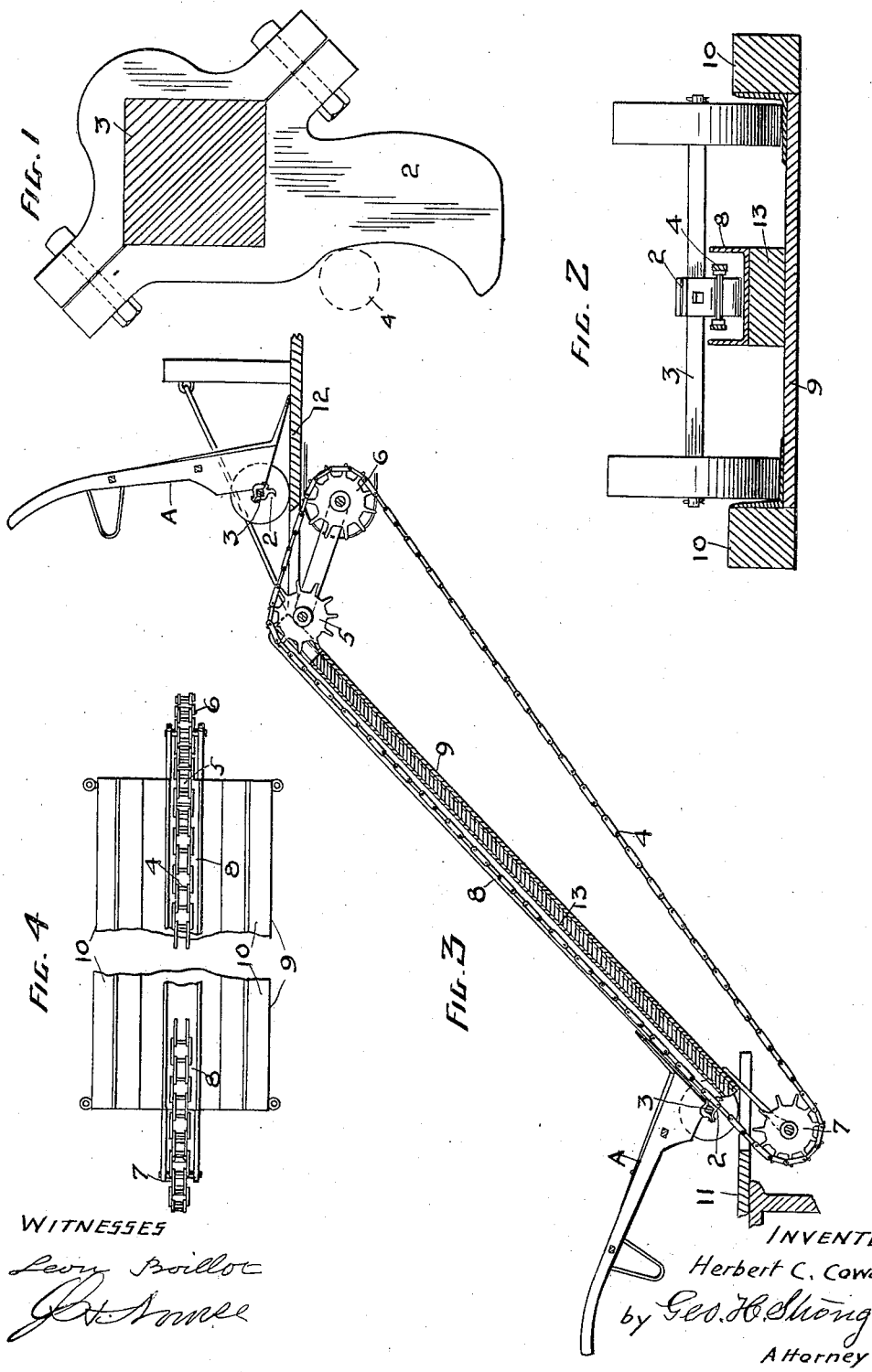
WITNESSES
INVENTOR
Herbert C. Coward
by Geo. H. Strong.
Attorney

UNITED STATES PATENT OFFICE.

HERBERT C. COWARD, OF OAKLAND, CALIFORNIA.

CONVEYER FOR HAND-TRUCKS.

No. 888,591.          Specification of Letters Patent.          Patented May 26, 1908.

Application filed September 4, 1907.   Serial No. 391,318.

*To all whom it may concern:*

Be it known that I, HERBERT C. COWARD, citizen of the United States, residing at Oakland, in the county of Alameda and State of California, have invented new and useful Improvements in Conveyers for Hand-Trucks, of which the following is a specification.

My invention relates to conveyers for hand trucks and the like. Its object is to provide a means for facilitating the movement of loaded hand trucks from one level to another, and it is especially designed for use in the loading and unloading of vessels, and generally in the conveying of goods in and about warehouses and elsewhere, where it is necessary now either to use an elevator, block and tackle, or other cumbersome and tedious means to lift the load.

The invention consists of the parts and the construction and combination of parts as hereinafter more fully described and claimed, having reference to the accompanying drawings, in which—

Figure 1 is a side elevation of the hook on the truck axle. Fig. 2 is a cross section of the ladder and chain with part of truck in elevation. Fig. 3 is an elevation in partial section illustrating the invention and its mode of operation. Fig. 4 is a plan view of the ladder.

A represents an ordinary two-wheeled hand truck, and 2 is a hook member secured in suitable fashion rigidly to the stationary axle 3 of the truck. Preferably this hook is made in two sections, bolted together, as shown in Fig. 1.

4 represents an endless sprocket chain with its upper carrying plane disposed at such an angle as best suits the requirements of the invention. This sprocket chain is adapted to pass around suitable sprockets 5—6—7, and is operated from any suitable source of power. The upper conveying plane of the chain runs in a channel guide 8 which is suitably supported on the incline or ladder 9. This ladder 9 has the side guide timbers 10, between which the wheels of the truck are adapted to travel in the transit of the truck from one floor or level to another.

The speed of the conveyer is regulated so that it will travel about the same rate that the truck is moving when pushed along by a man.

In operation, assuming that it is desired to transfer a truck from one floor or level, as 11, to an upper floor or level 12, the apparatus is set up so that the conveyer will extend between the two floors or levels, with the lower sprocket chain 4 arranged slightly below the lower floor 11. A truck provided with a hook member 2 is run along the floor 11, to cause the hook to come in contact with the chain. The traveling chain immediately takes hold of the hook, and without further effort on the part of the workman, except to maintain himself and the truck upright, the truck with its load is conveyed to the upper floor; the chain doing the pulling, and the truck wheels running up the ladder between the side guides 10.

The hook 2 need not be more than a couple of inches in length, and is curved on its side toward the handle of the truck, to insure its engagement by a link of the chain.

By having the chain travel in the channel guide, and elevating the channel guide from the floor of the ladder 9 on a suitable timber, as 13, the chain is brought close up to the axle, and not only insures the engagement of the chain with the hook when the truck is brought up to the ladder, but by engaging the load close up to the axle of the truck, the leverage on the axle is reduced to a minimum, and the lift on the load is more direct.

While I might use projections on the chain to engage the axle, the present construction is much preferred, for the reason that the links, being about two inches square, a hook on the axle will be almost immediately seized upon by the chain without the workman having to check his speed of travel, and without any sudden jerk on the load, as would occur if the truck stopped momentarily in order to allow the chain to come along to pick up the load.

By this construction the truck is always ready and the chain is always ready, and the chain presents only a smooth surface, with no projections on which anybody could be hurt.

The invention has been used with marked success in actual practice in the unloading of vessels.

Having thus described my invention, what I claim and desire to secure by Letters Patent is—

1. A conveyer for hand trucks and the like, comprising an endless conveyer arranged at an incline, and a member formed of two parts detachably united and fixed on the axle of the truck, one of said parts having a hook engageable by the conveyer.

2. A conveyer for hand trucks and the like, consisting in the combination of an endless link conveyer suitably supported at an incline, a member formed of sections bolted together and fixed on the axle, one of said sections having a hook engageable by the conveyer, and a track-way on which the wheels of the truck run during the period of engagement of the conveyer with the hook.

3. In an apparatus of the character described, the combination of a ladder or equivalent support, an endless chain conveyer mounted on sprockets on said ladder, an elevated channel guide in which the top conveying plane of said chain travels, and lateral wheel guides on the ladder.

4. In an apparatus of the character described, the combination of a ladder or equivalent support, an endless chain conveyer mounted on sprockets on said ladder, an elevated channel guide in which the top conveying plane of said chain travels, lateral wheel-guides on the ladder, and a truck having a hook member on its axle engageable by the links in the chain.

In testimony whereof I have hereunto set my hand in presence of two subscribing witnesses.

HERBERT C. COWARD.

Witnesses:
CECIL T. WALKER,
CLARENCE M. REUF.